(12) United States Patent
Koeszegi et al.

(10) Patent No.: US 11,777,345 B2
(45) Date of Patent: Oct. 3, 2023

(54) SECURING OF STATOR SEGMENTS

(71) Applicant: Flender GmbH, Bocholt (DE)

(72) Inventors: Attila Koeszegi, Kanjiza (RS); Andreas Lindmeier, Ruhstorf (DE); Dominik Ratzisberger, Kösslarn (DE); Franz Xaver Michael Schober, Neukirchen vorm Wald (DE); Christoph Schwarzbauer, Tiefenbach (DE); Lei Yue, Tianjin (CN)

(73) Assignee: Flender GmbH, Bocholt (DE)

( * ) Notice: Subject to any disclaimer, the term of this patent is extended or adjusted under 35 U.S.C. 154(b) by 249 days.

(21) Appl. No.: 17/426,517

(22) PCT Filed: Jan. 28, 2020

(86) PCT No.: PCT/EP2020/051979
§ 371 (c)(1),
(2) Date: Jul. 28, 2021

(87) PCT Pub. No.: WO2020/157031
PCT Pub. Date: Aug. 6, 2020

(65) Prior Publication Data
US 2022/0103027 A1    Mar. 31, 2022

(30) Foreign Application Priority Data
Jan. 29, 2019   (EP) .................................... 19154225

(51) Int. Cl.
*H02K 1/18* (2006.01)
*F16B 5/02* (2006.01)
*H02K 7/18* (2006.01)

(52) U.S. Cl.
CPC ............... *H02K 1/187* (2013.01); *F16B 5/02* (2013.01); *H02K 7/1838* (2013.01)

(58) Field of Classification Search
CPC .......... H02K 1/187; H02K 7/1838; F16B 5/02
See application file for complete search history.

(56) References Cited

U.S. PATENT DOCUMENTS 6,133,659 A * 10/2000 Rao ..................... B60L 15/2009
                                                          123/3
10,125,800 B1   11/2018 Dominguez
(Continued)

FOREIGN PATENT DOCUMENTS

| CN | 101521414 A | 9/2009 |
|----|-------------|--------|
| CN | 102695875 A | 9/2012 |

(Continued)

OTHER PUBLICATIONS

International Search Report issued by the European Patent Office in International Application PCT/EP2020/051979 dated Apr. 2, 2020.

*Primary Examiner* — Tulsidas C Patel
*Assistant Examiner* — Thomas K Quigley
(74) *Attorney, Agent, or Firm* — Henry M. Feiereisen LLC

(57) ABSTRACT

A stator of a directly driven wind power generator includes a stator support including flanges with bores and stator segments positioned on the flanges, when viewed in a circumferential direction. Each stator segment includes a segment support having recesses. At least two securing devices for each of the stator segments secure the stator segment to the flanges. Each securing device includes a bore part insertable in a corresponding one of the recesses, a shim, and an alignment pin insertable in a corresponding one of the bores of the flanges, so that the stator segment is positioned and secured vertically via the bore part and the alignment pin and via the shim to thereby realize a uniform air gap between the stator and a rotor of the wind power generator.

7 Claims, 4 Drawing Sheets

(56) References Cited

U.S. PATENT DOCUMENTS

2007/0049450 A1\* 3/2007 Miller ................. F16H 15/50
 476/72
2013/0285489 A1 10/2013 Lemma
2016/0305287 A1 10/2016 Honda et al.

FOREIGN PATENT DOCUMENTS

| CN | 103688449 A | 3/2014 |
| CN | 104979926 A | 10/2015 |
| CN | 108105231 | 6/2018 |
| EP | 2 736 154 | 5/2014 |
| EP | 3 032 704 | 6/2016 |
| EP | 3 352 334 | 7/2018 |
| JP | 2008-303935 A | 12/2008 |
| WO | WO 2018/113863 | 6/2018 |

\* cited by examiner

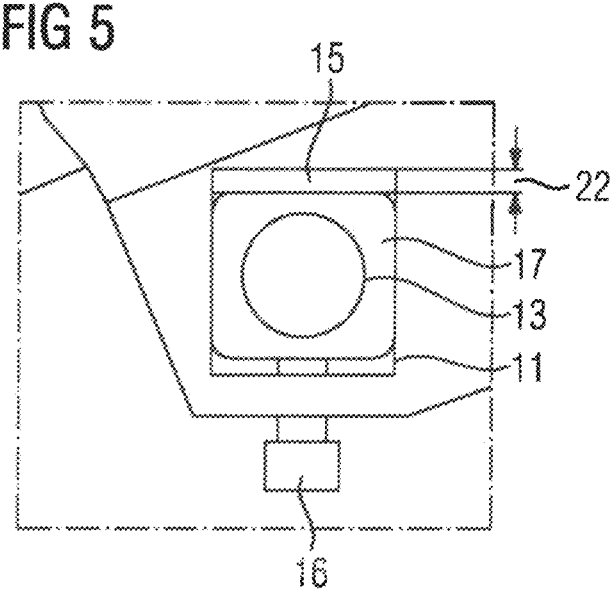
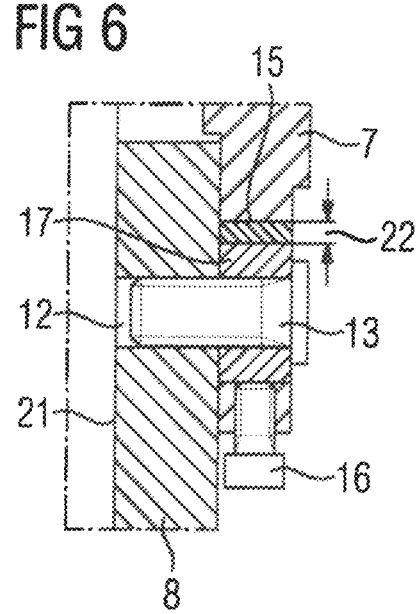
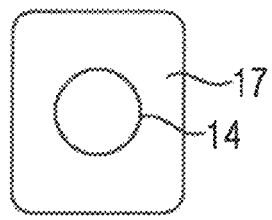
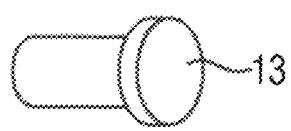
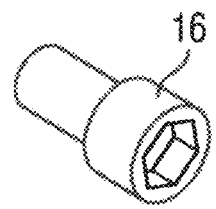
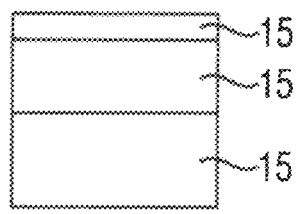

SECURING OF STATOR SEGMENTS

The invention relates to a stator of a directly driven wind power installation as well as to a method for assembling and positioning stator segments of a wind power installation of this type.

By virtue of the diameter of stators of directly driven wind power generators of 4 meters and more, said stators when viewed in the circumferential direction are assembled from a plurality of stator segments. The latter are typically six, eight or twelve stator segments which are assembled so as to form a ring. The stator segment is typically secured at both axial ends. By virtue of the size of the stator it is difficult to adhere to the required tolerances. Precise manufacturing is required in the production of the stator segments and the stator supports. Flexible adjustments in terms of the mutual, in particular radial, position of said stator segments and stator supports are not possible. The final external diameter is thus a function of the precise manufacturing of the stator supports as well as of the stator segments. This requires a high degree of complexity, this being highly cost-intensive.

Proceeding therefrom the invention is based on the object of providing a stator which avoids the above-mentioned disadvantages and in which the air gap between a stator and a rotor of a wind power generator is in particular easy to adjust and secure.

The object set is achieved by a stator of a directly driven wind power generator, having disposed thereon stator segments which, when viewed in the circumferential direction, are positioned on in particular two flanges of a common stator support that run in parallel,
wherein the flanges of the stator support have bores, wherein each stator segment is secured to the flanges by way of at least two securing devices,
wherein the stator segment has a segment support which has recesses into which a bore part is insertable,
wherein a securing device has a bore part, an alignment pin and at least one shim,
wherein the stator segment is able to be positioned and secured by way of the bore part situated in the recess and the alignment pin inserted into the bore of the stator support and the shim.

The object is also achieved by a method for positioning stator segments of a stator of a directly driven wind power generator for achieving a uniform air gap between the stator and a rotor by the following steps:
attaching a stator segment to a stator support by means of an assembly jig,
positioning the stator segment in relation to the stator support,
inserting a bore part in a region of a recess of the segment support of the stator segment provided to this end,
inserting an alignment pin into the axially aligned bore of the flange of the stator support and bore of the bore part of the segment support, and subsequently more precisely positioning the stator segment in a gap between an upper periphery of the bore part and the radially upper periphery of the recess by means of a shim,
repeating these steps on this stator segment at further securing points and securing points of the further stator segments until the stator segments have assumed the required position in relation to the rotor.

In order for in particular the radial positioning of the stator segment to henceforth be able to be designed in a flexible and positionally accurate manner, a precise adjustment of the segment support in relation to the flange or flanges of the stator support is now possible according to the invention. As a result of the choice of the thickness of the shim or shims, the segment support can be accordingly adjusted in a positionally accurate manner at the securing point. The alignment pin, also referred to as a cylindrical pin, by way of the oversize thereof in relation to the bores is inserted into the now axially aligned recesses, preferably of the bore part and of the bore of the flange. The flange of the stator support and of the segment support are thus connected to one another by the alignment pin.

Each stator segment here is preferably secured to the parallel flanges of the stator support such that each stator segment has four securing points on the stator support.

Of course, only two or three securing points per stator segment are also possible, the disposal thereof on the segment support to be chosen while taking into account inter alia static considerations.

Likewise, the stator segment can be fastened to a stator support by way of two or three securing points, said stator having only one flange. The stator segment in this instance here is equipped with a segment support which in axial terms is disposed so as to be substantially centric.

In principle, the position of the stator segment is now displaced radially, specifically in a quasi-radial manner. The displacement is more or less pronounced depending on the thickness of the shim. Unavoidable manufacturing tolerances of the stator segment and the components thereof (segment support, laminated core, etc.) can now be compensated for so as to achieve an ideally uniform air gap between the stator and the rotor.

Exact positioning is now performed by means of a bore part, an alignment pin and a shim. The ideal position of the securing point, thus of the stator segment on the predetermined location of the stator support, is effected by an assembly jig. The bore part is inserted in a recess of the segment support. The bore in the bore part and the bore in the flange of the stator support here are aligned so as to be axially aligned. The stator segment is positioned by the choice of the thickness of the shim which is inserted in the remaining intermediate space between the upper edge of the bore part and the upper edge of the recess in the segment support, and said stator segment is secured by the alignment pin.

Additional securing can be effected by a toggle screw which additionally secures the bore part and the shim on the segment support.

Preliminary positioning of the bore part can also be performed by way of the toggle screw. The position of the segment support is initially held with the aid of the assembly jig in the desired position. The bore part with the aid of the toggle screw and the shim is aligned such that the alignment pin can be inserted. The position of the segment support in relation to the stator support at this securing point is now held by the bore part and the shim, and secured by axially inserting the alignment pin into the axially aligned bores of the bore part and of the bore in the flange of the stator support.

According to the invention, this type of production and this type of assembly of stator segments on the stator support permits larger production tolerances of the individual components, said larger production tolerances being ultimately able to be compensated for by smaller parts which are easier to produce.

In principle, the method proceeds as follows:
The position of the segment support of the stator segment is initially held with the aid of the assembly jig in the desired position. Each securing point of a stator segment is positioned herein. Once a stator segment has been positioned and secured as described above, the same steps are repeated by means of the assembly jig at the neighboring stator segment.

It is likewise possible for an assembly jig to offer up two or a plurality of stator segments, or even all stator segments required for the stator.

The invention as well as further advantageous design embodiments of the invention will be explained in more detail by means of schematically illustrated exemplary embodiments. In the figures:

FIGS. 5, 6 show a securing point;

FIG. 7 shows a bore part;

FIG. 8 shows an alignment pin;

FIG. 9 shows a toggle screw; and

FIG. 10 shows shims of dissimilar thicknesses.

Figure 1:
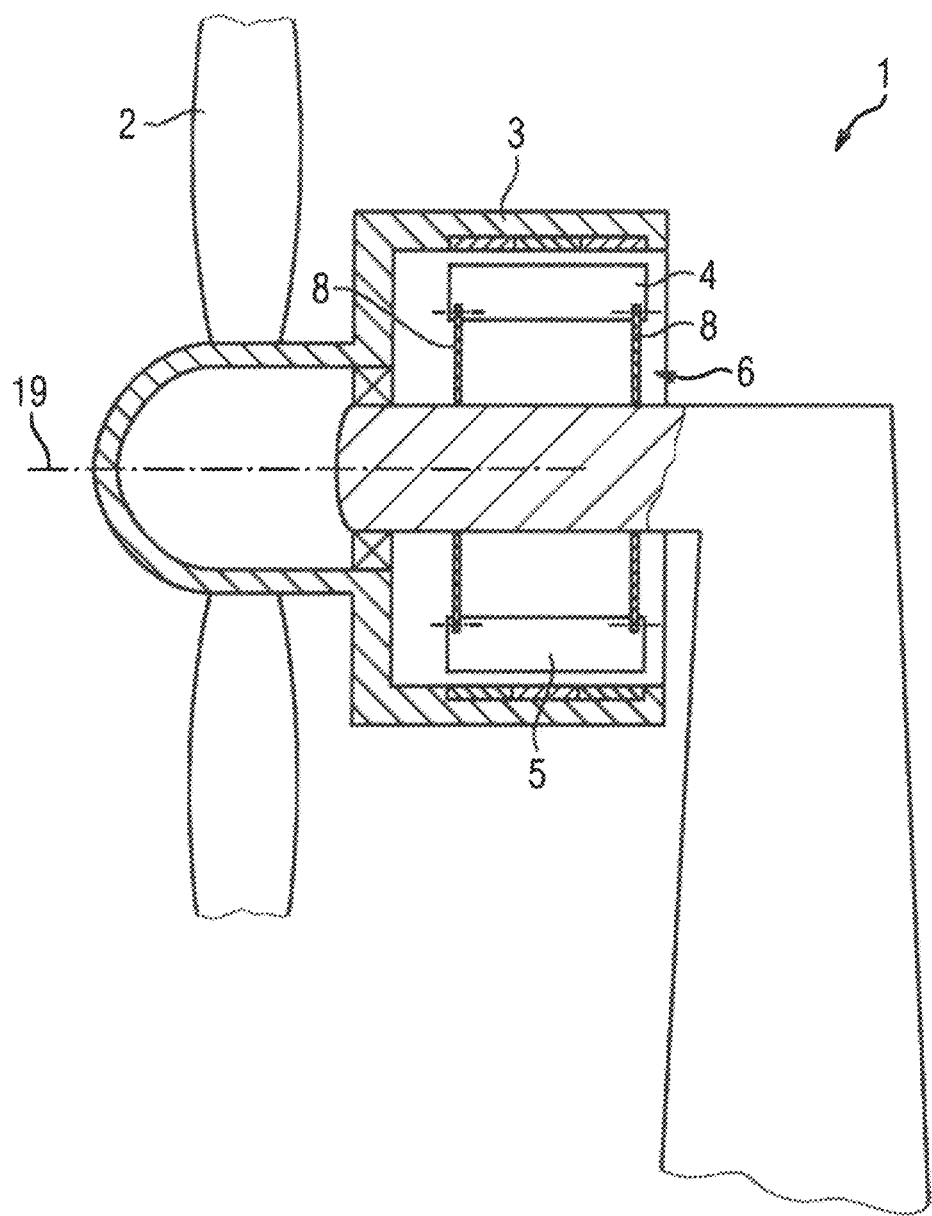
FIG. 1 shows a wind power installation in principle.

FIG. 1 shows a schematic illustration of a wind power installation 1 having a directly driven wind power generator having an external rotor. A rotor 3 here has permanent magnets which are not illustrated in more detail and electromagnetically interact with a coil system of a stator 4, said coil system not being illustrated in more detail, and by virtue of the rotation of the turbine 2 of the wind power installation 1 about an axis 19 thus provide electric power. The stator 4, when viewed in the circumferential direction, is subdivided into stator segments 5 which are in each case supported on one stator support 6 which has two flanges 8 running in parallel.

Figure 2:
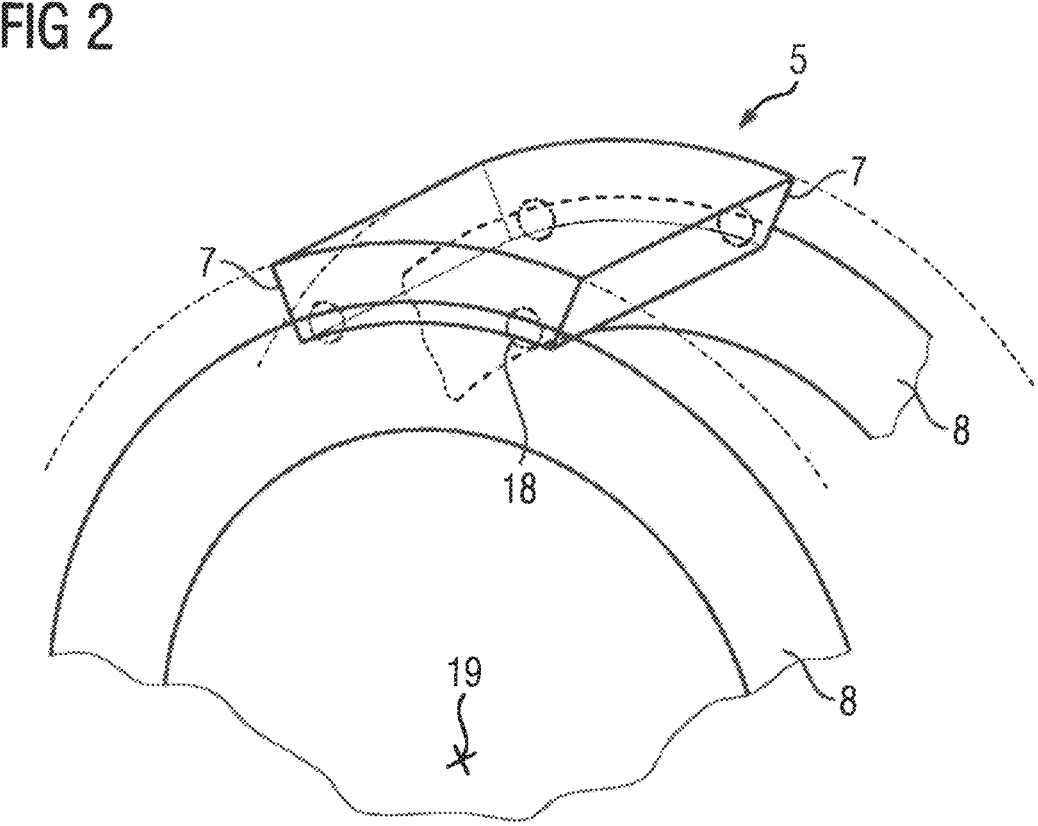
FIG. 2 shows a fragment of a stator segment on a stator support.

As is illustrated in more detail in FIG. 2, a stator segment 5 by, in this illustration, four securing points 18 is fastened to the stator support 6 by way of a suitable securing device, as will yet be described in more detail.

A stator segment 5 has a laminated core 9 which has axially parallel grooves 10 in which a coil system, not described in more detail, is disposed and secured. This laminated core 9 is axially delimited and held together by segment supports 7. A stator segment 5 is now fastened to the radially inner region on the stator support 6 by way of the segment supports 7.

Figure 3:
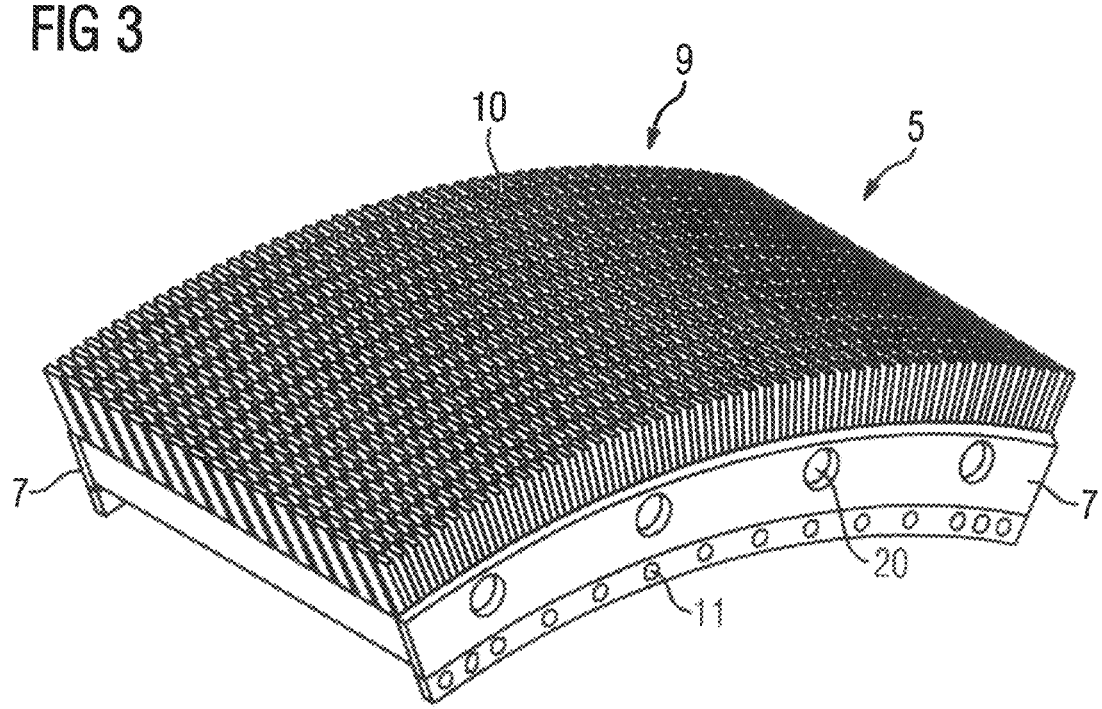
FIG. 3 shows a stator segment.

FIG. 3 in a perspective illustration shows a stator segment 5 having segment supports 7 which secure and hold the laminated core 9. The segment supports 7 in the radially inner region are provided with recesses 11 by way of which the stator segment 5 is ultimately secured to the stator support 6.

Cutouts 20 in the segment support 7, between the radially inner region and the laminated core 9, during the operation of the wind power installation enable a substantially axial air flow in the region of stator segments 5 and thus of the stator 4. This forms at least part of an air cooling of the stator 4 and thus of the wind power generator.

Figure 4:
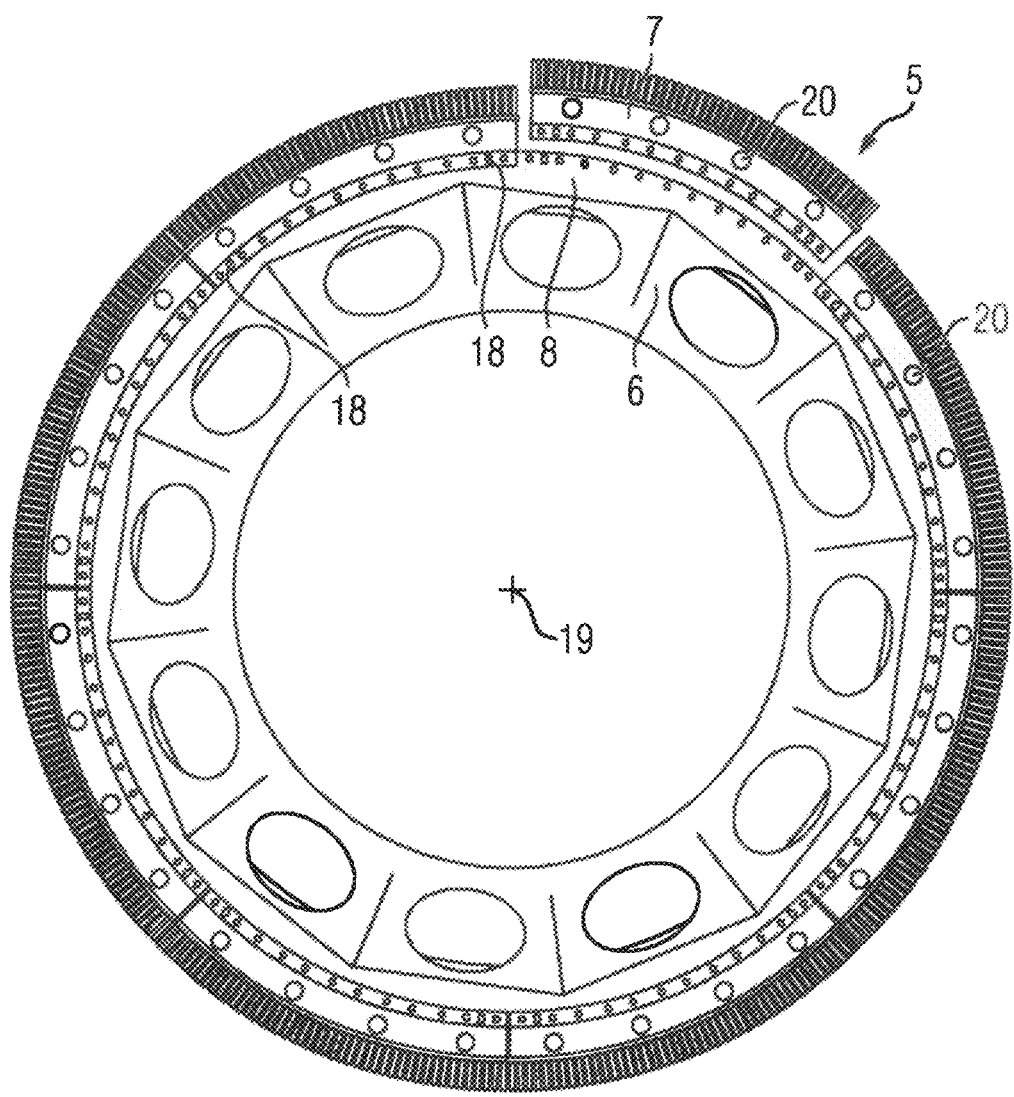
FIG. 4 shows a schematically illustrated production mode of a stator.

FIG. 4 schematically shows how the stator segments 5 are mutually aligned, positioned and thereafter secured on a stator support 6 by means of connections of the flange 8 of the stator support 6 and the segment support 7 of the stator segment 5.

FIG. 5 in a detailed illustration shows a securing point 18, wherein the securing device has a plurality of parts. On the one hand, the recess 11 of the segment support 7 into which a bore part 17 is insertable, said bore part 17 having a centric bore 14 into which an alignment pin 13 is insertable.

Exact positioning of the stator segment 5 is now performed by means of the bore part 17 (according to FIG. 7), an alignment pin 13 (according to FIG. 8) and at least one shim 15 (according to FIG. 10). The ideal predetermined position of the securing point 18, thus of the stator segment 5 at the predetermined location of the stator support 6, is effected by an assembly jig not illustrated in more detail. The bore part 17 is situated in a recess 11 of the segment support 7. The bore in the bore part 17 and the bore in the flange 8 of the stator support 6 here are aligned so as to be axially aligned. The stator segment 5 is secured, in particular in the radial position thereof, by the choice of the thickness of the shim 15 which is inserted into the remaining gap 22 between the upper edge of the bore part 17 and the upper edge of the recess 11 in the segment support 7.

The alignment pin 13 is slightly oversized in relation to the bore 12 in the stator support 6 and the bore 14 in the bore part 17 in the segment support 7. By means of the assembly jig, exact aligning, positioning and subsequent securing thus takes place by way of the bore part 17 and the shim 15 by means of the alignment pin 13. An exact air gap in relation to a rotor 3 is adjusted by repeating these steps for the stator segment 5 as well as ultimately for the entire stator 4.

The bore part 17 in terms of the recess 11 in the segment support 7 does not have to be machined to the exact dimension. In the event of tolerance-related dimensional inaccuracies arising, this is assumed, in particular in the quasi-radial direction, by the shim 15 according to FIG. 5.

The toggle screw 16 according to FIG. 9 likewise permits minor adjustment possibilities, said toggle screw 16 being able to be screwed radially into the bore part 17 from the direction of the stator support 6.

The toggle screw 16 is likewise suitable as an additional assembly aid during the alignment of the stator segment 5. The bore part 17 and/or the shim 15 here can be positioned or clamped during the assembly procedure.

The alignment pin 13 may also be replaced by a screw which protrudes from the far side 21. The screw can thus be counter-locked by means of a nut, this facilitating any potential disassembling of the stator segment 5.

What is claimed is:

1. A stator of a directly driven wind power generator, said stator comprising:
    a stator support including flanges, said flanges having bores;
    stator segments positioned on the flanges, when viewed in a circumferential direction, each said stator segment including a segment support having recesses; and
    at least two securing devices for each of the stator segments to secure the stator segment to the flanges, each said securing device including a bore part insertable in a corresponding one of the recesses, a shim, and an alignment pin insertable in a corresponding one of the bores of the flanges so that the stator segment is positioned and secured vertically via the bore part and the alignment pin and via the shim to thereby realize a uniform air gap between the stator and a rotor of the wind power generator.

2. The stator of claim 1, wherein the stator has two of said flanges extending in parallel relation.

3. The stator of claim 1, wherein the securing device is provided on an outer delimitation of the segment support.

4. The stator of claim 1, wherein the securing devices have each a plurality of said alignment pin arranged in axially parallel relation.

5. The stator of claim 1, wherein each of the flanges of the stator support has a bore, said alignment pin configured with an oversize with respect to the bore in the flange.

6. The stator of claim 1, further comprising a toggle screw additionally securing the shim on the segment support.

7. A method for positioning a stator segment of a stator of a directly driven wind power generator, said method comprising the steps of:
- a) attaching the stator segment to a stator support using an assembly jig;
- b) positioning the stator segment in relation to the stator support;
- c) inserting a bore part in a region of a recess of a segment support of the stator segment;
- d) inserting an alignment pin into axially aligned bores of a flange of the stator support and of the bore part in the segment support and subsequently more precisely positioning the stator segment in a gap between an upper periphery of the bore part and a radially upper periphery of the recess by means of a shim; and
- e) repeating steps a) to d) at further securing points of the stator segment and securing points of further stator segments until a required position of the stator segments has been realized in relation to a rotor of the wind turbine generator and an air gap of the wind power generator has been adjusted.

* * * * *